(12) United States Patent
Vadapandeshwara et al.

(10) Patent No.: US 9,507,567 B2
(45) Date of Patent: Nov. 29, 2016

(54) FACILITATING USE OF TECHNIQUES IMPLEMENTED BY EXTERNAL LIBRARY FUNCTIONS IN PROCESS DEFINITIONS OF ANALYTICAL APPLICATIONS

(71) Applicant: Oracle Financial Services Software Limited, Mumbai (IN)

(72) Inventors: Rajaram Narasimha Vadapandeshwara, Bangalore (IN); Manu Goyal, Bangalore (IN); Suresh Bahadur Singh, Bangalore (IN)

(73) Assignee: ORACLE FINANCIAL SERVICES SOFTWARE LIMITED, Mumbai (IN)

( * ) Notice: Subject to any disclaimer, the term of this patent is extended or adjusted under 35 U.S.C. 154(b) by 9 days.

(21) Appl. No.: 14/608,204

(22) Filed: Jan. 29, 2015

(65) Prior Publication Data

US 2016/0070542 A1  Mar. 10, 2016

(30) Foreign Application Priority Data

Sep. 9, 2014 (IN) .......................... 2875/MUM/2014

(51) Int. Cl.
*G06F 9/44* (2006.01)
(52) U.S. Cl.
CPC .. *G06F 8/22* (2013.01); *G06F 8/70* (2013.01)
(58) Field of Classification Search
CPC .................................. G06F 8/22; G06F 8/70
USPC ....................................................... 717/163
See application file for complete search history.

(56) References Cited

U.S. PATENT DOCUMENTS 7,117,480 B2  10/2006  Andersh et al.
7,149,734 B2  12/2006  Carlson et al.
(Continued)

OTHER PUBLICATIONS

A. Pravin , S Srinivasan, Efficient Algorithm Selection for Detecting Suitable Test Case Prioritization, IJCA Proceedings on International Conference on Recent Advances and Future Trends in Information Technology (iRAFIT 2012) iRAFIT(7):28-31, date Apr. 2012, pp. 1-4.

*Primary Examiner* — Lewis A Bullock, Jr.
*Assistant Examiner* — Theodore Hebert
(74) *Attorney, Agent, or Firm* — IPHorizons PLLC; Narendra Reddy Thappeta

(57) ABSTRACT

An aspect of the present disclosure provides a server system which facilitates use of techniques implemented by external library functions in the process definitions of analytical applications. In an embodiment, a definitions block enables users to develop process definitions as basis for corresponding user applications, with each process definition incorporating a corresponding set of techniques. The definitions block requires metadata corresponding to each technique to be present in registration data prior to permitting incorporation of the technique in process definitions. Accordingly an importation block is provided which facilitates a user to register an external technique implemented by a function of an external library to cause meta data corresponding to the external technique to be added to said registration data. As a result, the external technique can thereafter be used in development of new process definitions.

16 Claims, 10 Drawing Sheets

(56) References Cited

U.S. PATENT DOCUMENTS

| | | |
|---|---|---|
| 7,653,618 B2 | 1/2010 | Andreev et al. |
| 8,676,853 B2 | 3/2014 | Kasravi et al. |
| 2002/0174082 A1 | 11/2002 | Miloushev et al. |
| 2007/0028158 A1* | 2/2007 | Djorovich .............. G06Q 10/10 715/202 |
| 2007/0094638 A1 | 4/2007 | DeAngelis et al. |
| 2011/0276598 A1 | 11/2011 | Kozempel |
| 2012/0296929 A1* | 11/2012 | Hossain ............ G06F 17/30864 707/769 |
| 2013/0138690 A1 | 5/2013 | Reisbich |
| 2013/0211569 A1* | 8/2013 | Cherusseri ............. G06Q 10/06 700/97 |

* cited by examiner

401: void g08agc (Integer n, const double x[ ], double median,
402:     Nag_TailProbability tail, Nag_IncSignZeros zeros, double *w,
403:     double *z, double *p, Integer *non_zero, NagError *fail);

410: #include <stdio.h>
411: #include <nag.h>
413: #include <nag_stdlib.h>
415: #include <nagg08.h>
417: int main (void) {
419: double median = 0.05, p, w, z;
425: Integer n, non_zero;
426: NagError fail
430: *x=0;;
...
450: g08agc(n, x, median, Nag_TwoTail, Nag_IncSignZerosN, &w, &z, &p, &non_zero, &fail);

460: if (fail. code != NE_NOERROR) {
470: Vprintf ("Error from g08agc. \n%s\n" , fail .message); goto END;

| Model Definition New....Webpage Dialog | | | | - ☐ X |
|---|---|---|---|---|
| ⇦⇨ http://ofss2311621:7001/ofaaiut/modeling/ | | | | |

500

| Variable Name | Variable Type | Variable Classification | Configured Script Variable |
|---|---|---|---|
| Scaled Loss Severity | Idiosyncratic Variable | Numeric Variable | x |

560

NA ▽

− Input Parameters

| Input Name | Type | Description | Value |
|---|---|---|---|
| median | Single Value Parameter | | 0.05 |
| tail | Single Value Parameter | | Nag_Two_Tail |
| zeros | Single Value Parameter | | Nag_IncSignZerosY ▽ |
| | | | Nag_IncSignZerosN |

580

− Execution Status

Execution started for the model Id: 1406715105753_0

[Preview Data] [Save] [Cancel] [Execute] [Outputs]

590

| Audit Trails | Comments |
|---|---|

− Execution Status

*FIG. 5B*

FACILITATING USE OF TECHNIQUES IMPLEMENTED BY EXTERNAL LIBRARY FUNCTIONS IN PROCESS DEFINITIONS OF ANALYTICAL APPLICATIONS

PRIORITY CLAIM

The instant patent application is related to and claims priority from the co-pending India provisional patent application entitled, "Facilitating Use Of Techniques Implemented By External Library Functions In Process Definitions Of Analytical Applications", Serial No.: 2875/MUM/2014, Filed: 9 Sep. 2014, which is incorporated in its entirety herewith to the extent not inconsistent with the disclosure herein.

BACKGROUND OF THE DISCLOSURE

Technical Field

The present disclosure relates to analytical applications infrastructure, and more specifically to facilitating use of techniques implemented by external library functions in process definitions of analytical applications.

Related Art

Analytical applications typically are designed for operation on complex and voluminous data, and are used for tasks in various contexts such as stock market prediction, banking applications, and weather forecasting. Accordingly, the applications require use of complex mathematical and/or statistical models and computations, as is well known in the relevant arts.

Such complex models and computations are often developed as corresponding techniques, as is also well known in the relevant art. A technique essentially implements well known statistical/mathematical computational models for generating a corresponding desired output based on provided inputs. Examples of such techniques include Linear/Logistic Regression, TimeSeries-Arima, CART, Apriori, etc.

Process definitions are often the basis for defining the underlying processing logic of analytical applications. Each process definition is at a fairly high conceptual level (compared to programming languages such as C, Java, etc.), which facilitates efficient development of models by business savvy personnel without requiring writing of code in such a programming language. SAAS, Mathworks, etc., are some of the well known frameworks that operate based on process definitions, as is well known in the relevant arts.

Libraries contain several 'functions' that can be readily used in development of process definitions. Typically, libraries contain many elementary utilities, including techniques, as corresponding functions, such that the utilities/techniques can be used in the context of different types of analytical applications. Techniques are developed by incorporating such functions.

There are often external libraries that contain functions implementing techniques, which would be of interest in development of various analytical applications. For example, techniques corresponding to a modern theory/framework may be expressed as corresponding functions of an external library by a third party vendor, and it may be desirable to use such techniques in analytical applications of corresponding contexts.

There is a general need to facilitate use of techniques implemented by external library functions in process definitions of analytical applications.

BRIEF DESCRIPTION OF THE DRAWINGS

Example embodiments of the present disclosure will be described with reference to the accompanying drawings briefly described below.

FIGS. 3A and 3B are screenshots together illustrating the manner in which a user registers a technique implemented by an external library function in an embodiment of the present disclosure.

FIG. 4A depicts portions of a header file containing a signature of an external library function in an embodiment of the present disclosure.

FIG. 4B depicts portions of a source code generated corresponding to an incorporated external library function, in an embodiment of the present disclosure.

FIGS. 5A and 5B are screenshots together illustrating the manner in which a user forms a model by mapping variables of a registered technique to corresponding data elements, in an embodiment of the present disclosure.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

An aspect of the present disclosure provides a server system which facilitates use of techniques implemented by external library functions in the process definitions of analytical applications. In an embodiment, a definitions block enables users to develop process definitions as basis for corresponding user applications, with each process definition incorporating a corresponding set of techniques. The definitions block requires metadata corresponding to each technique to be present in registration data prior to permitting incorporation of the technique in process definitions. Accordingly an importation block is provided which facilitates a user to register an external technique implemented by a function of an external library to cause meta data corresponding to the external technique to be added to the registration data. As a result, the external technique can thereafter be used in development of new process definitions.

According to another aspect of the present disclosure, a server system receives identification of a function (implementing a technique) of an external library from a user/developer, and thereafter auto-detects a set of parameters in the interface definition of the function. Parameter information corresponding to the set of parameters may also be auto-detected, and the detected information is used to register the technique. The user can form models based on the registered technique by associating each parameter (in the registration information) with a corresponding data element from a data store. The user can then incorporate the model into a process definition, which when executed causes the external function (corresponding to the registered technique) to be executed as a part of the corresponding analytical application.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
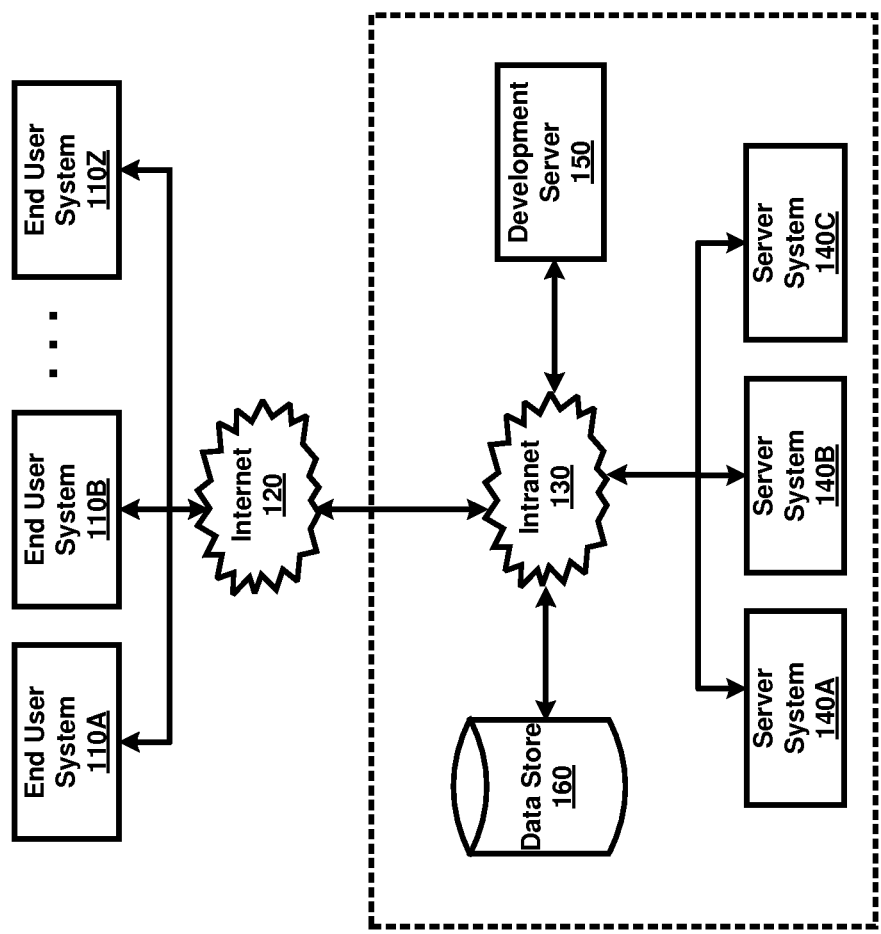
FIG. 1 is a block diagram illustrating an example environment in which several aspects of the present disclosure can be implemented.

FIG. 1 is a block diagram illustrating an example environment in which several aspects of the present disclosure can be implemented. The block diagram is shown containing end user systems 110A-110Z, Internet 120, intranet 130, server systems 140A-140C, development server 150, and data store 160.

Merely for illustration, only representative number/type of systems is shown in the Figure. Many environments often contain many more systems, both in number and type, depending on the purpose for which the environment is designed. Each system/device of FIG. 1 is described below in further detail.

Intranet 130 represents a network providing connectivity between server systems 140A-140C, development server 150 and data store 160, all provided within an enterprise (shown with dotted boundaries). Internet 120 extends the connectivity of these (and other systems of the enterprise) with external systems such as end user systems 110A-110Z. For example, Internet 120 may be implemented to connect to and/or download the external libraries that contain functions, which would be of interest in development of various analytical applications. Each of intranet 130 and Internet 120 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the destination system to which the packet is to be eventually delivered.

A (IP) packet is said to be directed to a destination system when the destination IP address of the packet is set to the (IP) address of the destination system, such that the packet is eventually delivered to the destination system by intranet 130 and Internet 120. When the packet contains content such as port numbers, which specifies the destination application, the packet may be said to be directed to such application as well. The destination system may be required to keep the corresponding port numbers available/open, and process the packets with the corresponding destination ports. Each of Internet 120 and intranet 130 may be implemented using any combination of wire-based or wireless mediums.

Data store 160 represents a non-volatile (persistent) storage facilitating storage and retrieval of a collection of data by applications executing in other systems of the enterprise such as server systems 140A-140C and development server 150. For example, data store 160 may be implemented to store external and internal libraries that contain functions, which would be of interest in development of various analytical applications. Therefore, data store 160 may be utilized in facilitating the retrieval of information regarding the external library function for use with other systems of the enterprise such as server systems 140A-140C and development server 150. Data store 160 may be implemented as a database server using relational database technologies and accordingly provide storage and retrieval of data using structured queries such as SQL (Structured Query Language). Alternatively or in addition, data store 160 may be implemented as a file server providing storage and retrieval of data in the form of files organized as one or more directories, as is well known in the relevant arts.

Each of end user systems 110A-110Z represents a system such as a personal computer, workstation, mobile station, mobile phones, computing tablets, etc., used by users to interact with server systems 140A-140C. In interacting with server systems 140A-140C, a user may initiate execution of analytical applications on server systems 140A-140C and/or view the output generated by such applications based on appropriate user interfaces (e.g., web pages). In addition, a user may interact with development server 150 and develop process definitions using various library functions according to aspects of the present disclosure.

Server systems 140A-140C execute (or host) analytical applications, with analytical applications implementing process definitions defined by users. The server systems 140A-140C together or individually provide various software infra-structure elements for execution of such applications. In an embodiment, the server systems 140A-140C are implemented in accordance with "Oracle Financial Services Analytical Applications Infrastructure", available from Oracle Corporation. Each analytical application may process various data elements stored in data store 160 and the resulting output may be provided to users on end user systems 110A-110Z and/or stored again in data store 160.

Development server 150 facilitates users to define various process definitions, which form the basis for analytical applications executing in server systems 140A-140C. Though shown as a separate system, it may be appreciated that development server 150 may be integrated into one or more of server systems 140A-140C. As noted above, many process definitions typically use several library functions, particularly in view of the complexity of logic in processing of the often large volumes of input data. The process definitions may readily use library functions provided by vendors of the software infra-structure provided in server systems 140A-140C. However, when the library functions are provided by third parties, and when such library functions implement techniques that are desirable for development of process definitions, it may be desirable to facilitate developers to employ such library functions into the infra-structure of server systems 140A-140C. Aspects of the present disclosure simplify usage of external library functions (i.e., the corresponding techniques) in process definitions, as described below with examples.

3. Using a Function from an External Library

Figure 2:
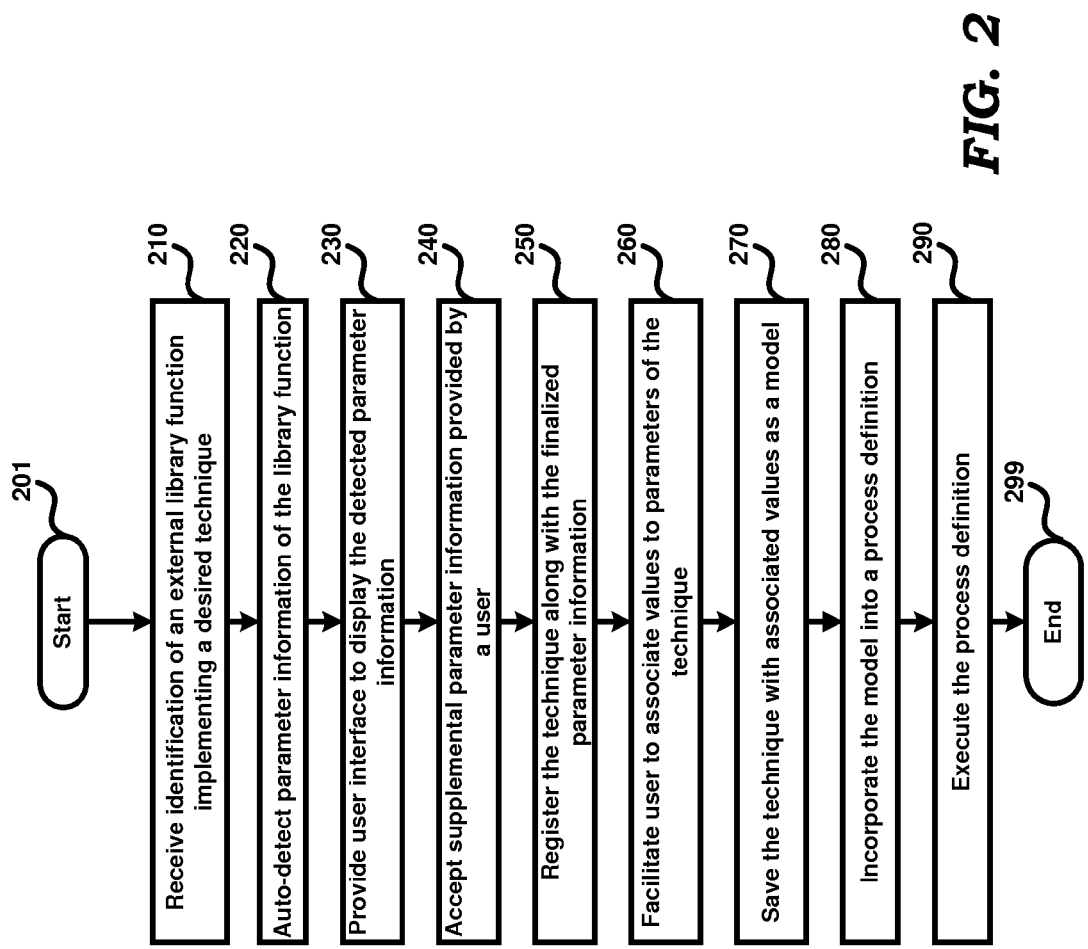
FIG. 2 is a flow chart illustrating the manner in which a user is facilitated to use techniques implemented by external library functions in process definitions of analytical applications according to an aspect of the present disclosure.

FIG. 2 is a flow chart illustrating the manner in which a user is facilitated to use techniques implemented by external library functions in the development of process definitions of analytical applications according to an aspect of the present disclosure. The flowchart is described with respect to the systems of FIG. 1 merely for illustration. However, the features can be implemented in other systems and environments also without departing from the scope and spirit of various aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210. For ease of description, the flowchart is described in the context of end user system 110A interfacing with development server 150, even though other user systems can operate similar to user system 110A.

In step 210, development server 150 receives the identification of an external library function, implementing a technique sought to be used in the development of process definitions of analytical applications. As there are normally several external libraries and each library contains several functions, the identification may need to contain respective portions identifying both the library and the specific function. The identification of the external library function may be received from end user system 110A.

In step 220, development server 150 auto-detects parameter information of the external library function. Auto-detection implies that the parameter information is determined by execution of software instructions, without requiring human intervention for such determination. Parameters are variables that operate as placeholders for representing input parameters and output parameters. Thus, each input parameter may be viewed as a placeholder variable, for associating a corresponding input value when invoking the library function in an analytical application. Each output parameter is also a placeholder, for associating the output generated by the function to a variable that can be used in analytical applications invoking the library function.

Parameter information specifies various characteristics of the corresponding parameter. Such characteristics may include the name of the parameter, the format of the parameter (e.g., an integer), and a description of the parameter (e.g., a single value parameter). In an embodiment described below, development server 150 auto-detects parameter information by parsing various portions such as interface exposed by the library provider, type definitions and comments in header files.

In step 230, development server 150 provides a user interface to display the detected parameter information noted above. The user interface may be presented on a display screen of end user systems 110A-110Z, and enables a user to review and supplement the parameter information.

In step 240, development server 150 accepts supplemental parameter information provided by the user. Supplemental parameter information may be of the same nature of information as noted above with reference to the parameter information, and is generally used for correcting any errors or omissions in the parameter information, as determined by auto-detection of step 220. The auto-detected information, when supplemented (i.e., adding in case of omissions and overriding in case of errors) results in finalized parameter information.

In step 250, development server 150 registers the technique, along with the finalized parameter information. Registration implies that the technique is thereafter available for development of process definitions along with any other prior registered techniques. The information saved with the registration further indicates that the saved information is associated with the external library function received as input in step 210.

In step 260, development server 150, by providing a user interface, facilitates the user to associate values to various parameters of the technique of step 250. The user can associate values to the various parameters either by entering the actual values for the parameters, or by linking the parameters to respective data items of a dataset, as related to the target analytical application in which the technique is sought to be integrated. Each parameter of the technique may be linked, for example, to a respective column of a table of a database or to specific individual values, as suited according to the requirements of the target analytical application.

In step 270, the technique along with the corresponding values entered in step 260 is saved by development server 150 as a model. A model thus represents the technique with the input and output parameters linked to appropriate data elements of data set (e.g., as hosted on the data store 160) or where the input and output parameters are provided values. Output parameters are place-holders and in an embodiment, if the user/modeler does not link variables place-holders to output values, the generated output values are nevertheless available in a format that is native to the underlying techniques provider and an implementation dumps the output as a serialized object for introspection later. It may be appreciated that multiple models can be defined (with corresponding data element and value associations), with different models being later used in the same or different process definitions.

In step 280, the model is incorporated as a component of a process definition. A process definition contains multiple components according to a flow, as specified by a developer. The components when executed according to the specified flow implement the desired functionality of the target analytical application. The model is thus incorporated as one of the components forming the process definition.

In step 290, the process definition is executed, causing the incorporated technique (the code representing the external library function, based on the input/output parameter association specified in steps above) also to be executed. The output(s) generated by the technique is stored in the corresponding data elements, as specified in the registration information of step 250. Execution of the components according to the flow specified in the process definition obtains the functionality, as required in the implementation of the corresponding analytical application. The flow chart ends in step 299.

The features described above with respect to FIG. 2 can be implemented in various embodiments, as will be apparent to one skilled in the relevant arts by reading the disclosure provided herein. The description is continued below with the details of some example embodiments.

4. Example User Interface

Figure 3A:
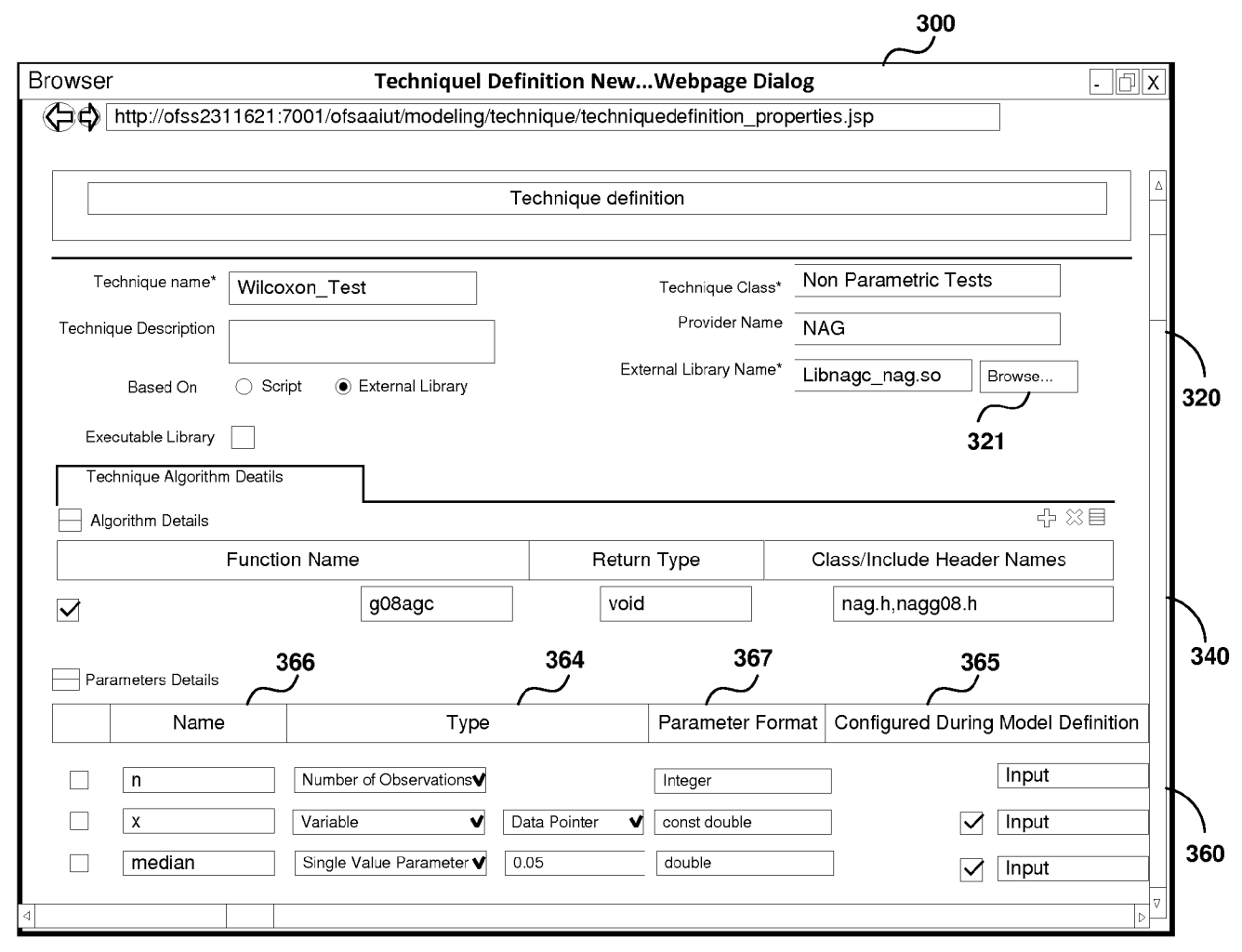
Figure 3B:
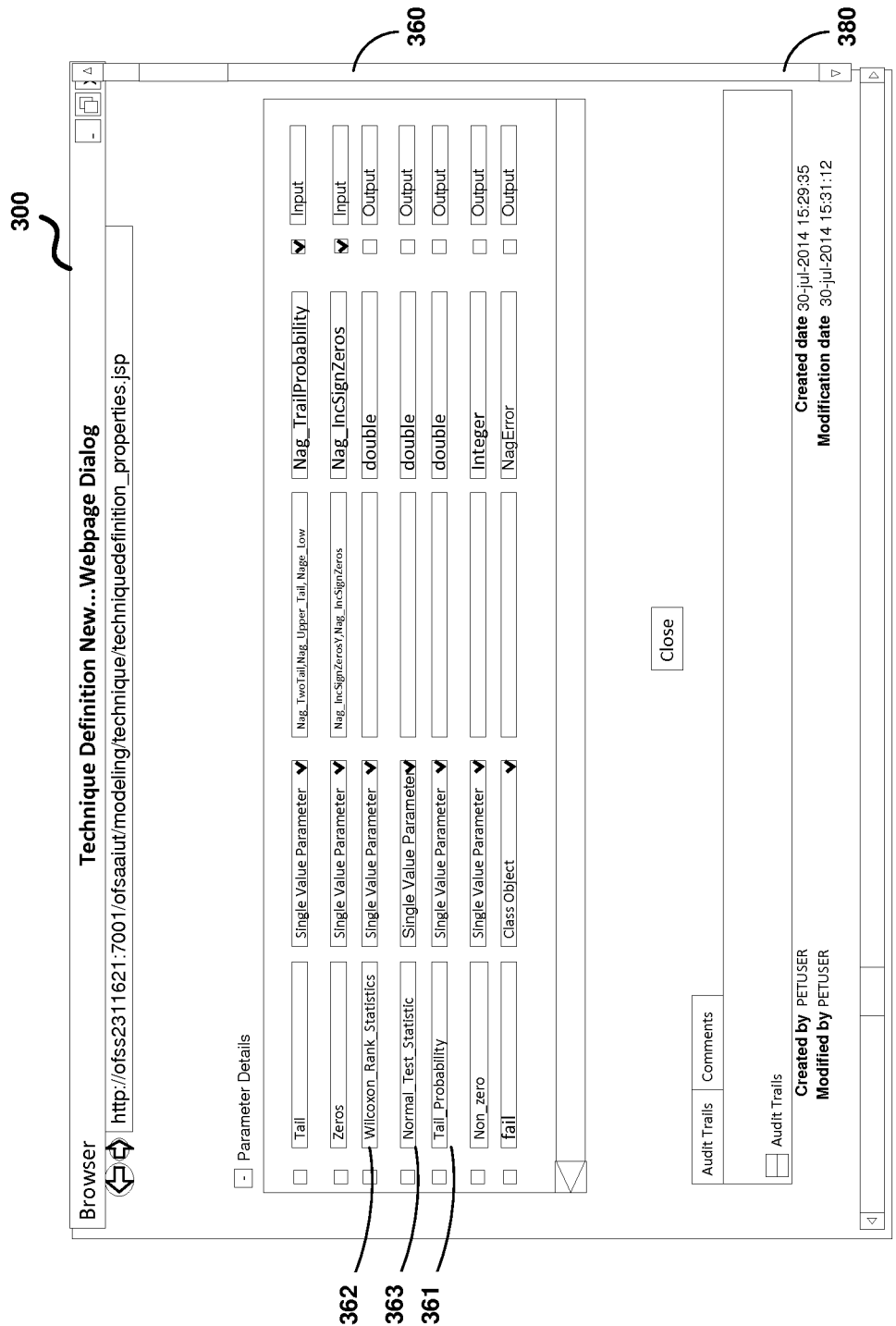

FIGS. 3A, 3B and 4A together illustrate an example user interface using which a developer can register a technique implemented by an external library function in an embodiment. The Figures are described in detail below.

Display area 300 (shown as contiguous sections in FIGS. 3A and 3B) depicts a portion of an analytical application's user interface that is provided on a display unit (not shown in FIG. 1) associated with end user system 110A. For ease of description, the example user interface is described in the context of end user system 110A interfacing with development server 150, even though other user systems can operate similar to end user system 110A.

Display area 300 corresponds to a webpage accessed by a user in response to sending a request to development server 150. The webpage is received from the development server 150 prior to being displayed on the display unit.

The user begins interacting with display area 320 by naming and providing a brief description of a technique that is set to be defined subsequently in display area 300. The user then assigns the newly named technique to a technique class. A technique class is a classification system internal to the environment of the present system, wherein one or more techniques are grouped together in a class based on some common objectives.

The user also identifies the provider of an external library and marks the technique as one that is being defined based on the external library. As previously described with reference to FIG. 1, the present disclosure is described in the context of the provider of the external library being a third party to the present environment.

In response to the user clicking/selecting the "Browse" button 321, display area 320 enables a user to select an external library from a list of external libraries (not shown in FIGS. 3A and 3B) made available to the analytical application by development server 150.

Display area 340 enables a user to input a function name (here, "g08agc") chosen from functions available in the external library selected in display area 320. While the present example shows the user input of the function name being in a free text format, the user may also be enabled to choose the function name from a list of function names (e.g., a drop down menu) pre-populated in the display area 340 in alternative embodiments. The user also inputs a return type (e.g., void) for the function, as well as the identity of one or more header files that are required for use with the function, even though in alternative embodiments some of such information can also be auto-detected by examining the header files, as described below.

Development server 150 then inspects a header file (a snippet of an exemplary header file is shown in FIG. 4A) to auto-detect parameter information of the function. Each function contains one or more parameters. Development server 150 auto-detects the parameter information by parsing various portions of the header file(s) such as comments and type definitions in declarations. For instance, as shown in FIG. 4A, lines 401-403 are shown with a declaration of the function, wherein the various parameters of the function are defined. The form of each parameter is conveniently shown in the type definitions of 401-403. However, various other content of the the header file (e.g., comments and declarations) may also be parsed for the desired parameter information as a part of such auto-detection.

As such, development server 150 parses the header files and extracts pertinent data regarding the parameters. For instance, for a parameter n, development server 150 parses the header file to identify the name of the parameter (n, by parsing line 401), and the format of the parameter (integer, by parsing line 401). Similarly, for a parameters p 361, w 362, and z 363, the development server 150 parses the header file of FIG. 4B to identify the name of the parameter (by parsing lines 402-403), and the format of the parameter (double, by parsing lines 402-403). This information, along with the auto-detected parameter information for all the other parameters of the function, is displayed in display area 360. To illustrate, columns 366 and 367 respectively show the auto-detected information, name and parameter format, for each parameter in the function.

Display area 360 also has placeholder columns and rows for other parameter information associated with the function. For example, display area 360 shows columns type 364 and 'configured during model definition' 365, which may be initially empty or may be pre-populated with auto-detected parameter information. The user may manually enter values in rows corresponding to each parameter, for the parameter information that is not auto-detected or for parameter information that is not correctly auto-detected.

In case the parameter information is initially empty, for example, for the parameter n, the user enters the type as being the number of observations. For the parameter median, the user enters the type as being a single value parameter with an assigned value of 0.05. The user also marks each of the parameters as being either an input parameter or an output parameter and indicates whether the value of the input parameters will be provided during the definition of a model (as will be discussed in more detail with reference to FIGS. 5A and 5B).

Development server 150 accepts all such supplemental parameter information provided by the user. Together with the auto-detected parameter information, such supplemental parameter information forms the finalized parameter information for the function.

Thereafter, in response to the user clicking/selecting the "Close" button, development server 150 registers the technique in the system, and associates the finalized parameter information with the registered technique.

Display area 380 shows some additional information about the technique, such as the identity and the last interacted time stamps for the user creating the technique and any subsequent user who may modify the technique.

Figure 5A:
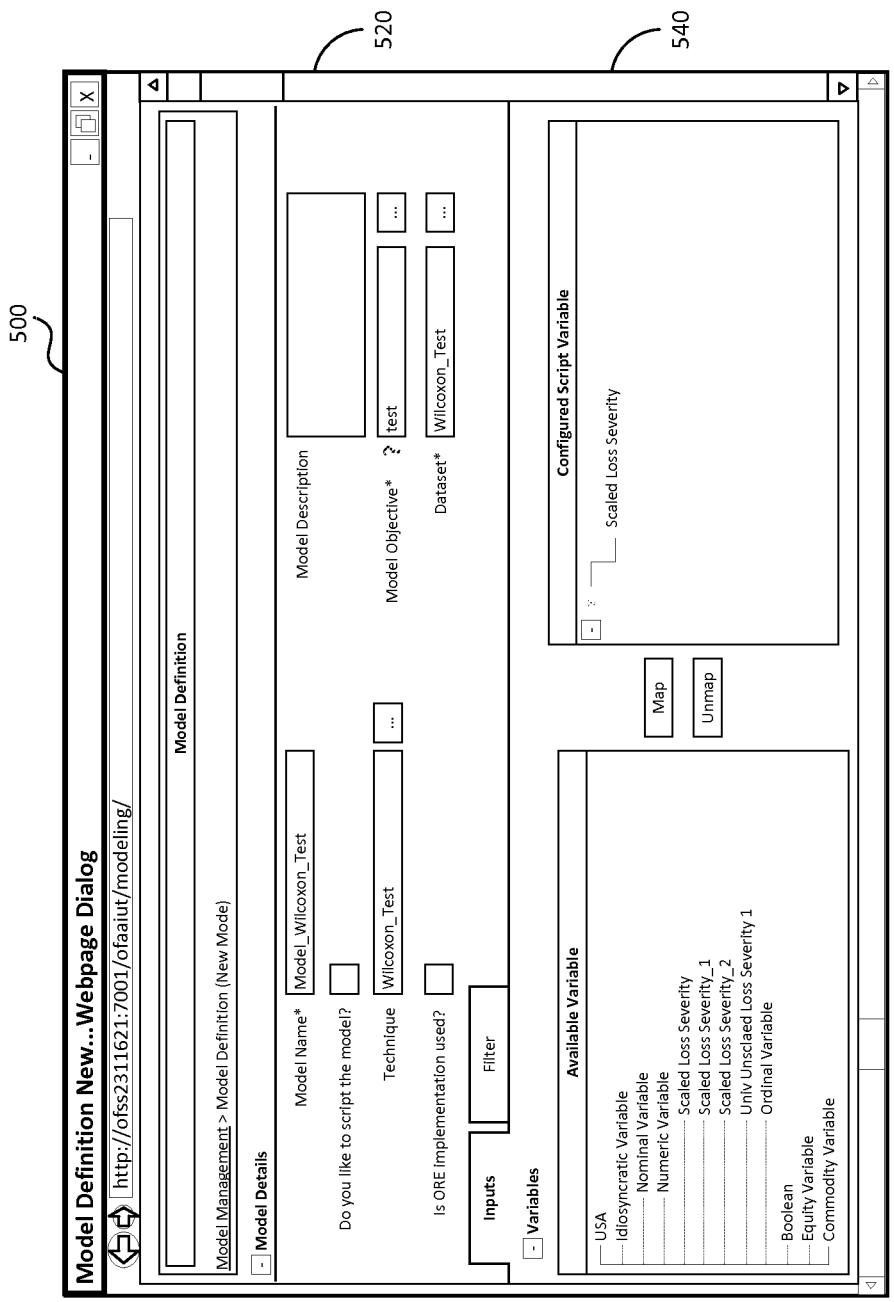

FIGS. 5A and 5B together illustrate the manner in which a technique that has been previously registered by development server 150 is subsequently processed to define and save a model. The Figures are described in detail below.

Display area 500 (shown as contiguous sections in FIGS. 5A and 5B) depicts a portion of an analytical application's user interface that is provided on a display unit (not shown in FIG. 1) associated with end user system 110A.

Display area 500 corresponds to a webpage accessed by a user in response to sending a request to development server 150. The webpage is received from development server 150 prior to being displayed on the display unit.

The user begins interacting with display area 520 by naming a model that is set to be defined subsequently in display area 500. The user then selects the previously registered technique (as shown with reference to FIGS. 3A and 3B) from a list of techniques made available to the user by development server 150.

By selecting the technique, the user enables development server 150 to bring to the user interface (e.g., display area 500) the list of parameters that have been previously saved with the technique, and were designated as being configured during the model definition (as described in FIGS. 3A and 3B, column 365).

In an embodiment, the user also has the option of indicating whether the user would choose to script the model being defined and whether an ORE (Oracle R Enterprise) implementation would be used in the model definition. ORE is supported out of the box as a default technique provider. Accordingly, if the ORE option is chosen, then the system internally builds some optimizations with respect to how the method or quant function is executed in the database (e.g., data store 160) and how results are gathered and written locally within the database to process/data output structures. Such optimizations may not be available/feasible for third party techniques. The user then chooses a model objective from a list of objectives made available to the user interface by development server 150.

The user then links the model to a dataset. For ease of description, the dataset in this example is understood as being implemented on data store 160 (of FIG. 1). However, the dataset may also be implemented as separate system either within or outside the environment described in FIG. 1, in alternative embodiment.

A dataset is a collection of data items defining a subject-area or functionality. For instance, all the data related to a particular functional area within an organization (e.g., HR, Retail Banking) may be organized under one dataset. The dataset may further comprise several smaller datasets or databases, each of which will in turn contain the data items that are being defined by the dataset.

Once the user completes identifying the technique and the corresponding settings in display screen 520, the development server 150 extracts the finalized parameter information saved previously (see FIGS. 3A and 3B) and displays the input variables associated with the technique in display screen 540.

Display screen 540 enables the user to link one or more parameters to variables in the dataset. The variables shown on the left hand side of screen 540 represent the labels assigned to the data items contained in the selected dataset. To illustrate, if the dataset contains a 2-dimensional matrix of columns and rows, with each row containing an actual data item, the column headers would be represented as the variables (labels) on the left hand side of display screen 540.

As shown previously with reference to the example in FIGS. 3A and 3B, the registered technique was shown to have four (4) input parameters that were marked as being defined during the model configuration (x and median from FIG. 3A, Tail and Zeros from FIG. 3B).

In display screen 540, the user links one of the parameters, x, to a variable of the dataset (Scaled Loss Severity). By linking the parameter to the variable, the user indicates to development server 150 that the inputs provided to this parameter would be supplied from the dataset, meaning that there would be no manual provision of input values as they relate to this selected parameter x.

To map the parameter to the variable of the dataset, the user selects the parameter x on the right hand side of display screen 540, then selects the desired variable from the left hand side of the display screen, and then selects/clicks the "Map" button to link the x parameter to the selected variable, Scaled Loss Severity. Similarly, the user may also, while selecting the parameter on the right hand side of display screen 540 select/click on the "Unmap" button to unlink the parameter to the selected variable.

Display screen 560 shows a list of variables from the dataset that have been previously mapped to the parameters of the technique. Display screen 560 also shows the classification of the variable as has been identified in display screen 540. For example, display screen 560 shows that the variable Scaled Loss Severity is an idiosyncratic variable that has been classified as a numeric variable. This classification information was previously identified in display screen 540.

Display screen 580 displays the various input parameters available for the selected technique, except those parameters that have already been mapped, as shown in screens 540 and 560. In addition to listing the parameters themselves, display screen 580 also displays information about the parameters that has been previously entered. To illustrate, display screen 580 shows the type of the parameter corresponding to each parameter (e.g., median is a single value parameter). Information on the type of the parameter was entered previously in conjunction with column 364 in FIGS. 3A and 3B. In display screen 580, the user associates a corresponding input value to the parameters by entering the parameter value in the "Value" column. The Value column may be configured to accept inputs either in free text form or as a function of the user selecting a particular value from a list of pre-defined values (e.g., a drop-down menu).

After mapping or entering the corresponding values for each of the parameters required by the technique, the user has the option to save the model definition or to cancel the model definition by selecting/clicking the corresponding buttons on display screen 590. Saving the model would allow the user to utilize the model at a later point in time, with respect to integrating the model into a process definition. Canceling the model would require the user to re-define all the model parameters as shown with respect to display screens 520-580. The user, as shown in screen 590, also has the option to view the new model definition's details (such as the parameters, the mapping, and the parameter values) by selecting/clicking on the corresponding "Preview Data" button.

The user can choose to test the model by selecting/clicking the "Execute" button shown in screen 590. Executing the model will execute the technique as implemented by the external library function, by taking into account the input parameters of the technique previously defined in the model, and producing the output(s) as defined by the technique in FIGS. 3A and 3B.

When the user seeks to execute the model, development server 150 generates a source code, as shown in FIG. 4B. Source code 490 shown in FIG. 4B corresponds to parameter values entered in FIGS. 5A and 5B and the order of the parameters shown in FIG. 4A. As shown in source code 490, lines 410-415 define the header files that are needed to execute the source code. Lines 419-426 define the data types for various input and output parameters. Line 419 defines the input parameter median's data type as double and sets its value as 0.05 (as previously shown in FIG. 5B), and defines the data type of output parameters p (tail_probability), w (wilcoxon_test_statistics), and z (normal_test_statistic) as double. Line 425 sets the data type of input parameter n and output parameter non_zero as an integer. Line 426 defines the data type of output parameter fail as being NagError. Line 430 defines the starting value of input parameter x as zero.

Line 450 shows the selected function g08agc with the input and output parameters as defined. Lines 460 and 470 define the error handling mechanism of source code 490. Specifically, if there is an error in the execution of function (represented by code in line 460), then an error message is printed (represented by code in line 470).

Development server 150 then compiles source code 490 along with the header files (shown in lines 410-415) to generate object code, which is then linked to the external library shown in FIG. 3A (i.e., libnagc_nag.so) to form an executable file. The external library provides a compiler executing the function with the function's definition. The function definition is the actual body of the function (not visible to the user or to the development server 150) that contains a collection of statements that define what the function does, i.e., what the utility of the technique is. The executable file represents the model such that each time the model is invoked in the present environment, it is the executable file corresponding to the model that is invoked and subsequently executed. Creating an executable file for each model with corresponding input and output parameter values allows for generation of multiple models based on a single technique, with each model containing corresponding input and output parameter values and with each model thereby generating a separate executable file for further re-use.

The user can review the output generated by the execution of the model by selecting/clicking on the corresponding "Outputs" button shown in screen 590.

Figure 6:
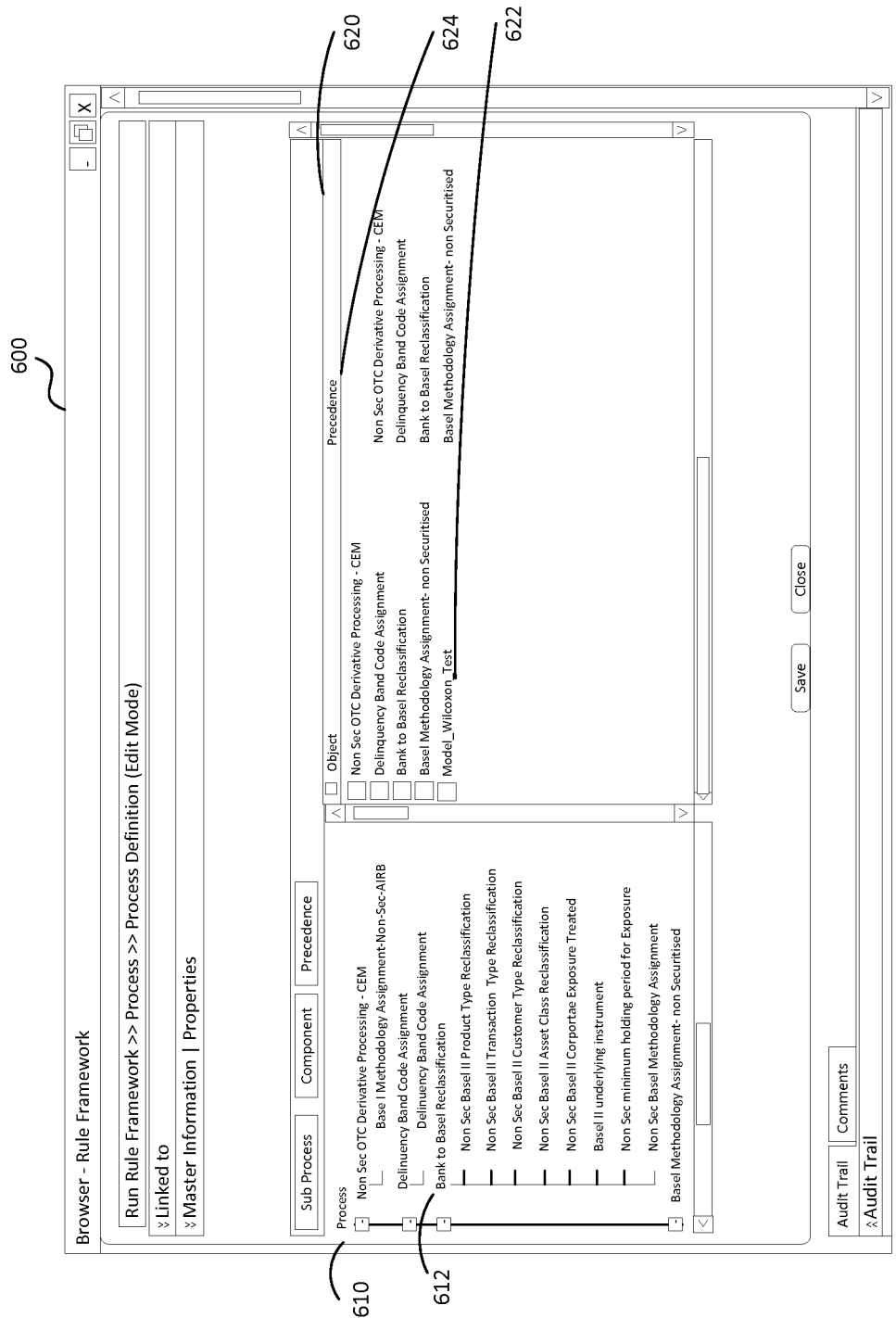
FIG. 6 depicts portion of a process definition incorporating an earlier formed model in an embodiment of the present disclosure.

FIG. 6 illustrates the manner in which a model that has been previously saved by development server 150 is subsequently included in a process definition.

Display area 600 depicts a portion of an analytical application's user interface that is provided on a display unit (not shown in FIG. 1) associated with end user system 110A.

Display area 600 corresponds to a webpage accessed by a user in response to sending a request to development server 150. The webpage is received from the development server 150 prior to being displayed on the display unit.

Display screen 610 shows the various process definitions that are available in the analytical application. For example, Bank to Basel Reclassification 612 is a process definition that has been previously defined in the analytical application. For each process definition selected, display screen 620 shows several process components that define a certain flow to the process definition.

Execution of the components according to the flow specified in the process definition obtains the functionality that is desired in the overall implementation of the analytical application.

Display screen 620 shows model 622, which was previously defined with respect to FIGS. 5A and 5B. Model 622 is added to process definition 612 as one of the several process components.

Display screen 620 not only shows the several process components of the process definition, but also shows the order of precedence in which each of the process components are executed when the process definition is executed. Column 624 defines the order in which the several components of process definition 612 are ordered. For example, the process component Delinquency Band Code Assignment is configured to be executed only after the process component Non Sec OTC Derivative Processing-CEM is executed.

Further, process components may be configured such that the output of a process component higher in the order (e.g., Bank to Basel Reclassification) becomes the input of the process component lower in the order (e.g., Basel Methodology Assignment-non Securitised), and the output of such lower component becomes the input of another process component even lower in order (e.g., Model_Wilcoxon Test).

The user may then save the process definition for later use. For instance, upon execution, the saved process definition may be compiled and executed by the server system 140A to produce a desired functionality, as required in the implementation of the corresponding analytical application. Thus, when the process definition is sought to be executed, it results in the generation of dynamic code, which has process definition's own runtime code bound to the corresponding external library (e.g., external library libnagc-_nag.so shown in FIG. 3A). Execution of such resulting dynamic code produces the desired functionality.

Accordingly, the desired techniques implemented by external library functions are facilitated to be incorporated in process definitions of analytical applications. Therefore, analytical applications are facilitated to make use of externally available techniques.

It should be appreciated that the features described above can be implemented in various embodiments as a desired combination of one or more of hardware, executable modules, and firmware. The description is continued with respect to an embodiment in which various features are operative when the instructions in the executable modules are executed.

5. Example Implementation of a Server System

Figure 7:
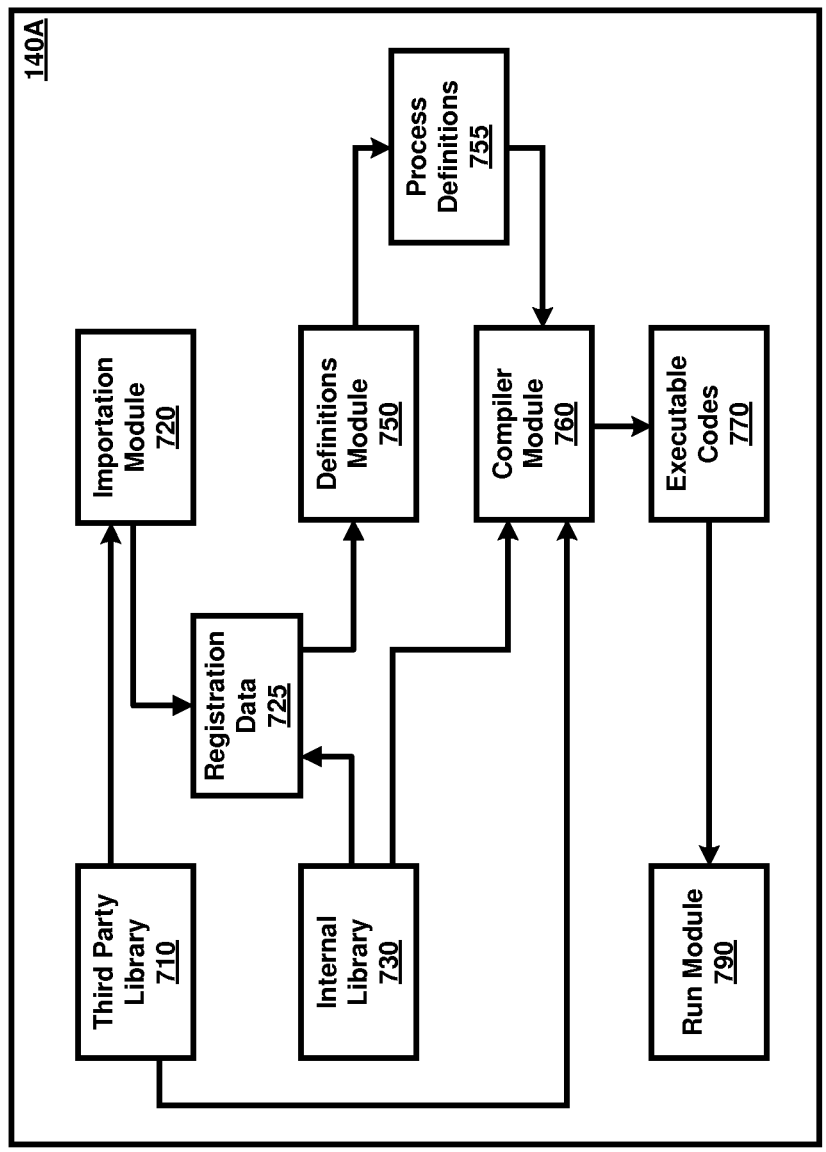
FIG. 7 is a block diagram illustrating the details of a server system in an embodiment of the present disclosure.

FIG. 7 is a block diagram illustrating the details of server system 140A in an embodiment. The description is provided assuming development server 150 is implemented as a part of server system 140A. In addition, for ease of description, the example server system is described in the context of server system 140A, even though other server systems can operate similar to server system 140A.

Server system 140A is shown containing third party library 710, importation module 720, registration data 725, internal library 730, definitions module 750, process definitions 755, compiler module 760, executable code 770, and run module 790. Each module may be realized in the form of appropriate software instructions executing on corresponding processor(s). Each block is described in further detail below.

Third party library 710 provides external libraries made available by a third party provider. The external libraries contain object files implementing the specific techniques provided by the third party provider. As is common with many financial applications, the third party providers provide various files that specify the signature of the functions implementing the techniques. As may be readily appreciated, the signature specifies the various input/output parameters. The parameter information corresponding to such parameters may be provided in the same files that specify the signature and/or other sources such as program files (including header files). All such files having the requisite parameter information are conveniently shown as a part of third party library 710.

Registration data 725 contains information on various techniques that are registered for usage as models. According to an aspect of the present disclosure, such registration is a pre-requisite before the corresponding technique can be incorporated into process definitions 755. The nature of registration data 725 depends on the implementation environment of server system 140A. In an embodiment, registration data 725 is saved as meta-data, an example of which is shown in Appendix A.

Importation module 720 facilitates the user to register techniques implemented by corresponding functions of third party library 710. To this end, importation module 720 may implement various operations and user interfaces described above with respect to steps 210-250 and FIGS. 3A and 3B. As a consequence of registration, registration data 725 is updated with the meta-data corresponding to the imported technique implemented by third party library 710.

Internal library 730 represents the library files and the corresponding program/header files that are made available by vendors who provide the software infra-structure in the server system. In one embodiment, the software infra-structure and the internal library are provided by Oracle Corporation. It is further assumed that all techniques implemented by functions of internal library 730 are registered in registration data 725 and thus available for incorporation into process definitions executed by various analytical applications.

Process definitions 755 contain various definitions developed by users/developers. As may be readily appreciated, the process definitions may be based on functions defined in internal library 730 or third party library 710. In an embodiment, each process definition is in the form of components defined according to a desired execution order.

Definitions module 750 facilitates incorporation of various registered techniques into process definitions 755. In an embodiment, models are first defined based on registered techniques, and the defined models are incorporated into process definitions, as described above. An example of a model defined based on a technique and saved in the form of metadata is shown in Appendix B.

Executable codes 770 represent the compiled code, ready for execution. The executable code may be generated for each process definition contained in process definitions 755.

Compiler module 760 generates the executable code (770) corresponding to each process definition. The executable code for each process definition may be generated dynamically upon initiation of execution of the corresponding definition (in 755). The object files implementing the functions corresponding to incorporated models, are retrieved from internal library 730 or third party library 710 (as applicable), in generating the executable code. Accordingly, the specific third party libraries from which external techniques are imported may need to be provided as inputs to the corresponding compile command (e.g., CC command available in Unix/Linux type environments).

In an embodiment, compiler module 760 generates a wrapper (in the form of C/C++ DLL (dynamic link library)), which binds the values associated for the various input and output parameters of the registered technique and invokes the object files implementing the registered technique in third party library 710. A built-in runtime generator thereafter links the wrapper and the implementing object files in third party library 710 to form the executable code corresponding to each process definition.

Run module 790 executes the executable code corresponding to each process definition to provide the analytical application tailored for the corresponding defined input/output parameters of the incorporated techniques.

It should be further appreciated that the features described above can be implemented in various embodiments as a desired combination of one or more of hardware, executable modules, and firmware. The description is continued with respect to an embodiment in which various features are operative when the instructions in the executable modules are executed.

6. Digital Processing System

Figure 8:
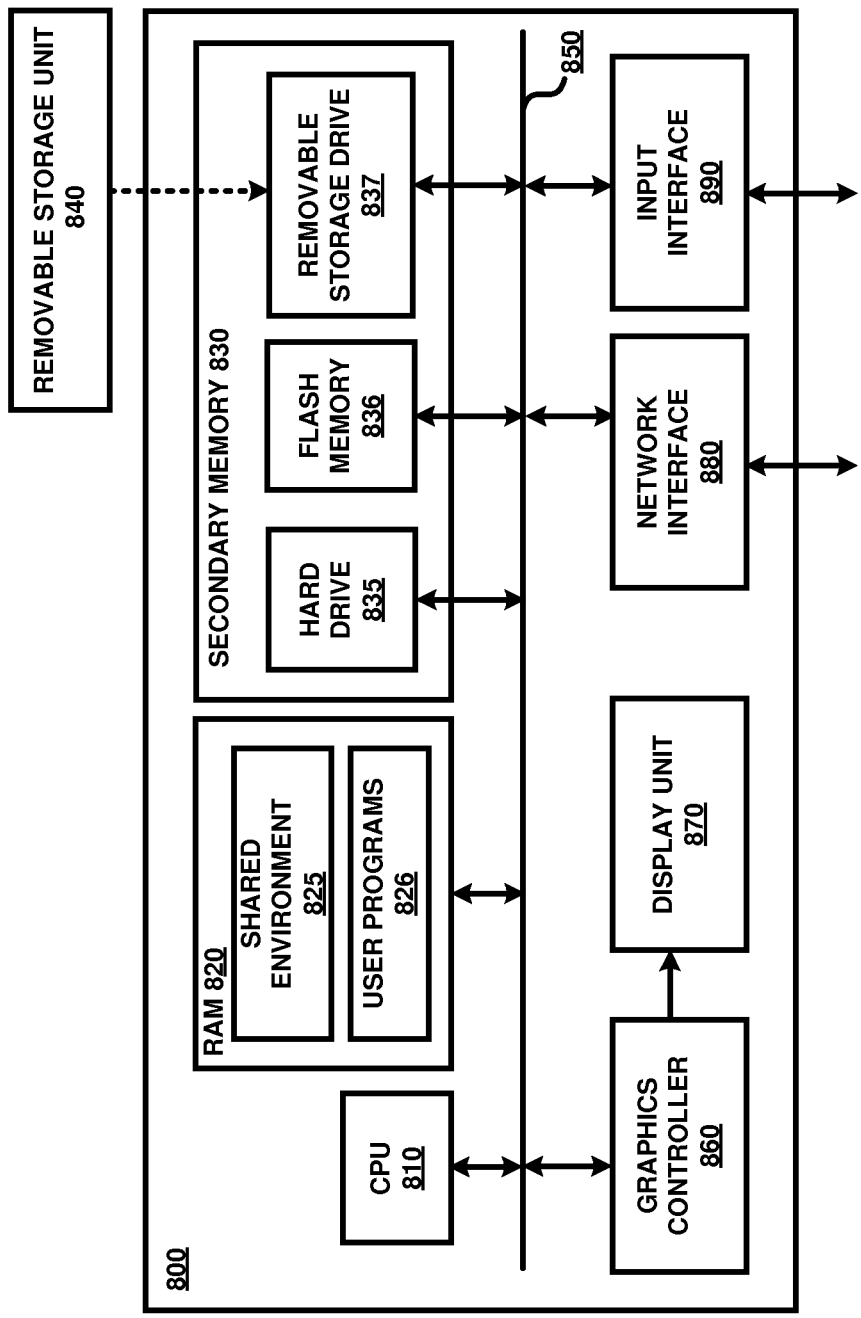
FIG. 8 is a block diagram illustrating the details of a digital processing system in which several aspects of the present disclosure are operative by execution of appropriate executable modules.

FIG. 8 is a block diagram illustrating the details of digital processing system 800 in which various aspects of the present disclosure are operative by execution of appropriate executable modules. Digital processing system 800 may correspond to any of the server systems 140A-140C and development server 150.

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present disclosure. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions constituting shared environment 825 and/or user programs 826 (such as analytical applications, etc.). Shared environment 825 may contain software programs such as device drivers, virtual machines, etc., which provide a (common) run time environment for execution of the user programs.

Graphics controller 860 generates display signals (e.g., in RGB format) to display unit 870 based on data/instructions received from CPU 810. Display unit 870 contains a display screen to display the images defined by the display signals. Input interface 890 may correspond to a keyboard and a pointing device (e.g., touch-pad, mouse) and may be used to provide inputs. Network interface 880 provides connectivity to a network (e.g., using Internet Protocol), and may be used to communicate with other systems connected to the network (110, 140 and 150 of FIG. 1).

Secondary memory 830 may contain hard drive 835, flash memory 836, and removable storage drive 837. Secondary memory 830 may store the data (for example, portions of the technique or model) and software instructions (for implementing the steps of FIG. 2), which enable digital processing system 800 to provide several features in accordance with the present disclosure. The code/instructions stored in secondary memory 830 may either be copied to RAM 820 prior to execution by CPU 810 for higher execution speeds, or may be directly executed by CPU 810.

Secondary memory 830 may contain hard drive 835, flash memory 836, and removable storage drive 837. Some or all of the data and instructions may be provided on removable storage unit 840, and the data and instructions may be read and provided by removable storage drive 837 to CPU 810. Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 830. Volatile media includes dynamic memory, such as RAM 820. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 850. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

7. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

APPENDIX A

```
{
    "isSelfExeJar": "N",
    "authorized": "Y",
    "desc": "",
    "status": "Approved",
    "techClassCode": "14098309213601~regression{*}",
    "libraryName": "libgsl.a",
    "OREOption": "N",
    "id": "1409831257329",
    "input": [
        {
            "subType": "Variable",
            "name": "x",
            "value": "",
            "dispName": " ",
            "type": "INPUT"
        },
        {
            "subType": "Variable",
            "name": "y",
            "value": "",
            "dispName": " ",
            "type": "INPUT"
        }
```

APPENDIX A-continued

```
    ],
    "document": "",
    "techtype": "T",
    "providerName": "",
    "algodetails": [
        {
            "order": "0",
            "name": "gsl_fit_linear",
            "className": "gsl/gsl_fit.h",
            "algoInputs": [
                {
                    "order": "0",
                    "funcName": "gsl_fit_linear",
                    "userInput": "Y",
                    "paramValueType": "const double",
                    "subType": "Variable",
                    "name": "x",
                    "dispName": "",
                    "type": "INPUT",
                    "inputDataFormat": "DP"
                },
                {
                    "order": "1",
                    "funcName": "gsl_fit_linear",
                    "userInput": "N",
                    "paramValueType": "const size_t",
                    "subType": "NCOLS",
                    "name": "xstride",
                    "value": "x",
                    "dispName": "",
                    "type": "INPUT",
                    "inputDataFormat": ""
                },
                {
                    "order": "2",
                    "funcName": "gsl_fit_linear",
                    "userInput": "Y",
                    "paramValueType": "const double",
                    "subType": "Variable",
                    "name": "y",
                    "dispName": "",
                    "type": "INPUT",
                    "inputDataFormat": "DP",
                    "inpDataFormat": "DP"
                },
                {
                    "order": "3",
                    "funcName": "gsl_fit_linear",
                    "userInput": "N",
                    "paramValueType": "const size_t",
                    "subType": "NCOLS",
                    "name": "ystride",
                    "value": "y",
                    "dispName": "",
                    "type": "INPUT",
                    "inputDataFormat": ""
                },
                {
                    "order": "4",
                    "funcName": "gsl_fit_linear",
                    "userInput": "N",
                    "paramValueType": "size_t",
                    "subType": "NREC",
                    "name": "n",
                    "dispName": "",
                    "type": "INPUT",
                    "inputDataFormat": ""
                },
                {
                    "order": "5",
                    "funcName": "gsl_fit_linear",
                    "userInput": "N",
                    "paramValueType": "double",
                    "subType": "SVPARAM",
                    "name": "c0",
                    "dispName": "",
                    "type": "OUTPUT",
                    "inputDataFormat": ""
                },
                {
```

APPENDIX A-continued

```
                "order": "6",
                "funcName": "gsl_fit_linear",
                "userInput": "N",
                "paramValueType": "double",
                "subType": "SVPARAM",
                "name": "c1",
                "dispName": "",
                "type": "OUTPUT",
                "inputDataFormat": ""
            },
            {
                "order": "7",
                "funcName": "gsl_fit_linear",
                "userInput": "N",
                "paramValueType": "double",
                "subType": "SVPARAM",
                "name": "cov00",
                "dispName": "",
                "type": "OUTPUT",
                "inputDataFormat": ""
            },
            {
                "order": "8",
                "funcName": "gsl_fit_linear",
                "userInput": "N",
                "paramValueType": "double",
                "subType": "SVPARAM",
                "name": "cov01",
                "dispName": "",
                "type": "OUTPUT",
                "inputDataFormat": ""
            },
            {
                "order": "9",
                "funcName": "gsl_fit_linear",
                "userInput": "N",
                "paramValueType": "double",
                "subType": "SVPARAM",
                "name": "cov11",
                "dispName": "",
                "type": "OUTPUT",
                "inputDataFormat": ""
            },
            {
                "order": "10",
                "funcName": "gsl_fit_linear",
                "userInput": "N",
                "paramValueType": "double",
                "subType": "SVPARAM",
                "name": "sumsq",
                "dispName": "",
                "type": "OUTPUT",
                "inputDataFormat": ""
            }
        ],
        "returnType": "int"
    }
    ],
    "name": "TPT_GSL",
    "lastModifier": "USER1",
    "lastModifiedDate": "05-Sep-2014 15:52:02",
    "output": [ ],
    "createdDate": "04-Sep-2014 17:17:37",
    "techClassParentHcy":
"14098309213601~regression@14098309213600~External lib tech",
    "createdUser": "USER1"
}
```

APPENDIX B

```
{
    "modelCode": "1409912567789",
    "techId": "1409831257329", /* mapped to "id" field under the
TechniqueEnc.txt which respresents encoding for technique is a provider
neutral format */
    "objectiveCode": "1401193410268",
    "objectiveName": "Copula",
```

APPENDIX B-continued

```
    "OREOption": "N",
    "v_type": "T",
    "dataSetId": "DS30002",
    "creationDate": "2014-09-05 15:55:11",
    "modelName": "TPT_GSL_Model",
    "flag": "TPT",
    "inputs": [
        {
            "subType": "Variable",
            "name": "x",
            "value": [
                {
                    "id": "V1400061058695",
                    "order": "0",
                    "name": "Variable - Scaled Loss Severity"
                }
            ],
            "dispName": " ",
            "defaultValue": [
                {
                    "id": "V1400061058695",
                    "order": "0",
                    "name": "Variable - Scaled Loss Severity"
                }
            ],
            "type": "Input"
        },
        {
            "subType": "Variable",
            "name": "y",
            "value": [
                {
                    "id": "V1399879648001",
                    "order": "1",
                    "name": "Variable - Unsealed Loss Severity"
                }
            ],
            "dispName": " ",
            "defaultValue": [
                {
                    "id": "V1399879648001",
                    "order": "1",
                    "name": "Variable - Unsealed Loss Severity"
                }
            ],
            "type": "Input"
        }
    ],
    "docList": "",
    "dataSetName": "Operational Loss",
    "timeRef": [ ],
    "maxModelVersion": "1",
    "outputs": "[ ]",
    "evalJson": {
        "subType": "EVALNA",
        "name": "",
        "value": " ",
        "dispName": "",
        "type": "EVAL"
    },
    "user": "USER1",
    "filters": [ ],
    "techName": "TPT_GSL",
}
```

What is claimed is:

1. A method of using techniques implemented by functions of external libraries, said method being implemented in a digital processing system, said method comprising:

receiving identification of a function of an external library from a developer, wherein said function implements a technique, said function being invocable using an interface definition;

auto-detecting a set of parameters in said interface definition of said function;

receiving parameter information from a user, said parameter information indicating that a first parameter of said set of parameters is of an input type and would be required to be configured during model definition;

registering said technique along with said set of parameters and said parameter information;

facilitating during said model definition, a user to form a model by associating each of said set of parameters with a corresponding value or a corresponding data element from a data store, wherein said user is required to provide a value or a data element for said first parameter in view of said parameter information indicating that said first parameter is of said input type and would be configured during said model definition;

incorporating the model into a process definition; and executing said process definition to cause execution of said function of said external library with the corresponding values associated by said user or values of corresponding associated data elements from said data store for respective parameters in said interface definition.

2. The method of claim 1, wherein said auto-detecting also detects parameter information corresponding to each of said set of parameters, wherein said parameter information contains a name of said parameter and a type of said parameter.

3. The method of claim 2, wherein said auto-detecting comprises examining a program file to detect said set of parameters and corresponding parameter information.

4. The method of claim 3, wherein said method further comprises:

providing a user interface to display the detected parameter information; and accepting supplemental parameter information provided by the user via said user interface, wherein said supplemental parameter information contains errors or omissions in the auto-detected parameter information, said detected parameter information, supplemented by said supplemental parameter information, defining a finalized parameter information, wherein said finalized parameter information is used in said forming of said model.

5. The method of claim 1, wherein the facilitating step comprises:

receiving input from a user identifying said data store as a data source;

displaying a set of variables provided by said data source, each of said set of variables corresponding to a respective data element in said data store; and enabling said user to associate one of said set of variables to one of said set of parameters.

6. A digital processing system comprising:

one or more processing units; and a random access memory (RAM) to store instructions, wherein said one or more processing units retrieve said instructions and execute said instructions, wherein execution of said instructions causes said digital processing system to perform the actions of:

receiving identification of a function of an external library from a developer, wherein said function implements a technique, said function being invocable using an interface definition;

auto-detecting a set of parameters in said interface definition of said function;

receiving parameter information from a user, said parameter information indicating that a first parameter of said set of parameters is of an input type and would be required to be configured during model definition;

registering said technique along with said set of parameters and said parameter information;

facilitating during said model definition, a user to form a model by associating each of said set of parameters with a corresponding value or a corresponding data element from a data store, wherein said user is required to provide a value or a data element for said first parameter in view of said parameter information indicating that said first parameter is of said input type and would be configured during said model definition;

incorporating the model into a process definition; and executing said process definition to cause execution of said function of said external library with the corresponding values associated by said user or values of corresponding associated data elements from said data store for respective parameters in said interface definition.

7. The digital processing system of claim 6, wherein said auto-detecting also detects parameter information corresponding to each of said set of parameters, wherein said parameter information contains a name of said parameter and a type of said parameter.

8. The digital processing system of claim 7, wherein said auto-detecting comprises examining a program file to detect said set of parameters and corresponding parameter information.

9. The digital processing system of claim 8, wherein the actions further comprise:

providing a user interface to display the detected parameter information; and accepting supplemental parameter information provided by the user via said user interface, wherein said supplemental parameter information contains errors or omissions in the auto-detected parameter information, said detected parameter information, supplemented by said supplemental parameter information, defining a finalized parameter information, wherein said finalized parameter information is used in said forming of said model.

10. The digital processing system of claim 6, wherein for said facilitating, said digital processing system performs the actions of:

receiving input from a user identifying said data store as a data source;

displaying a set of variables provided by said data source, each of said set of variables corresponding to a respective data element in said data store; and enabling said user to associate one of said set of variables to one of said set of parameters.

11. The digital processing system of claim 6, wherein said memory stores a registration data, wherein metadata corresponding to each technique is required to be present in said registration data prior to incorporation of the corresponding technique into process definitions, wherein said registering comprises adding to said registration data, metadata corresponding to said technique.

12. A non-transitory machine readable medium storing one or more sequences of instructions for enabling a system to use techniques implemented by functions of external libraries, wherein execution of said one or more instructions by one or more processors contained in said system enables said system to perform the actions of:

receiving identification of a function of an external library from a developer, wherein said function implements a technique, said function being invocable using an interface definition;

auto-detecting a set of parameters in said interface definition of said function;

receiving parameter information from a user, said parameter information indicating that a first parameter of said set of parameters is of an input type and would be required to be configured during model definition;

registering said technique along with said set of parameters and said parameter information;

facilitating during said model definition, a user to form a model by associating each of said set of parameters with a corresponding value or a corresponding data element from a data store, wherein said user is required to provide a value or a data element for said first parameter in view of said parameter information indicating that said first parameter is of said input type and would be configured during said model definition;

incorporating the model into a process definition; and executing said process definition to cause execution of said function of said external library with the corresponding values associated by said user or values of corresponding associated data elements from said data store for respective parameters in said interface definition.

13. The non-transitory machine readable medium of claim 12, wherein said auto-detecting also detects parameter information corresponding to each of said set of parameters, wherein said parameter information contains a name of said parameter and a type of said parameter.

14. The non-transitory machine readable medium of claim 13, wherein said auto-detecting comprises examining a program file to detect said set of parameters and corresponding parameter information.

15. The non-transitory machine readable medium of claim 14, wherein said second set of instructions further comprising instructions for:

providing a user interface to display the detected parameter information; and accepting supplemental parameter information provided by the user via said user interface, wherein said supplemental parameter information contains errors or omissions in the auto-detected parameter information, said detected parameter information, supplemented by said supplemental parameter information, defining a finalized parameter information, wherein said finalized parameter information is used in said forming of said model.

16. The non-transitory machine readable medium of claim 12, wherein said facilitating further comprises:

receiving input from a user identifying said data store as a data source;

displaying a set of variables provided by said data source, each of said set of variables corresponding to a respective data element in said data store; and enabling said user to associate one of said set of variables to one of said set of parameters.

\* \* \* \* \*